Patented Feb. 21, 1950

2,498,593

UNITED STATES PATENT OFFICE 2,498,593

DAYLIGHT FLUORESCENT RESINOUS SHEETING MATERIALS

Joseph L. Switzer, Cleveland Heights, and Robert C. Switzer, South Euclid, Ohio

No Drawing. Application February 23, 1949, Serial No. 78,006

13 Claims. (Cl. 252—301.2)

The present invention relates to improvements in dyed elastomer sheetings and more particularly to such sheetings which exhibit the phenomenon termed "daylight fluorescence." This application is a continuation-in-part of our copending applications Serial No. 414,285 filed October 9, 1941, Serial No. 452,522 filed July 27, 1942, Serial No. 455,610 filed August 21, 1942, and Serial No. 575,364 filed January 30, 1945.

As pointed out in the above-identified applications, the fluoragents available to the prior art can be classified generally as inorganic fluorescent pigments and organic fluorescent dyes. The term "fluorescent dye" as employed in this specification and the appended claims is to be understood to include soluble fluorescent organic dyestuffs, fluorescent intermediates and like fluorescent organic compounds except unsubstituted hydrocarbons.

The term "daylight fluorescence" as used in this specification and appended claims refers to the phenomenon of fluorescence in sunlight or other light having a spectrum containing substantially all of the visible wave lengths of sunlight as distinguished from fluorescence which is noticeable only in the presence of ultraviolet or "black" light in the substantial absence of visible light.

Various proposed theories on the nature of "fluorescence" and "daylight fluorescence" have been given in our above-mentioned application Serial No. 575,364 and for the sake of simplicity will not be repeated herein.

It is an object of this invention to provide dyed or pigmented elastomer sheetings which are not only brilliantly fluorescent when exposed to fluorescigenous radiations in the substantial absence of visible light, but which are also so bright in color, under daylight, that they produce and effective purity and brightness of color which is vastly superior to the colors of sheetings containing only subtractive color pigments.

It is an advantage and startling result of our invention that a sheeting employing our daylight fluorescent pigments may project more light of a given color than is present in the visible light incident to the sheeting. The term "daylight fluorescence" has been coined to describe this phenomenon. This phenomenon is most strikingly observed in colors which are predominantly of the longer wave lengths of visible light; for example, red elastomer sheetings employing our pigments may project as much as 120 to 130% of the light of a corresponding color in the incident visible light. Due to this phenomenon of daylight fluorescence, the colors of our sheetings are extremely bright and far exceed normal subtractive colors in distinguishability at a distance. Due to the fact that daylight fluorescent sheetings can project a disproportionately large amount of light of the dominant wave length, colors may be exceedingly pure in their total effect. In comparison a subtractive-colored pigment of the prior art having the same proportional purity was regarded as exhibiting a very bright and pure color even though it reflected only about 60% of the incident visible light in the dominant wave length.

Without restricting ourselves to subsequently developed theories, we account for the phenomenon of daylight fluorescence on the theory that the color is exhibited not only by reflecting a dominant wave band of the incident visible light but also by emitting a portion of the remaining energy of the incident light which has been converted to light of the dominant wave band by fluorescence.

It is a further object of this invention to provide elastomer sheetings which are daylight fluorescent and which are remarkably stable in daylight and under weathering conditions to permit their use in many practical applications. It is an advantage of our invention that the sheetings may be produced in a wide range of colors varying, for example, from blue to red.

Other objects and advantages of our invention will be apparent from the following discussion of specific examples of our invention and from the appended claims.

In general, we have discovered that we may obtain daylight fluorescent elastomer sheetings by utilizing as a combined fluoragent and chromogenic agent an organic dye which exhibits color when in solution and which fluoresces in response to long wave or "near" ultraviolet when in a weak solution in a transparent solvent, provided that two further conditions are met:

(a) The concentration of the dye in the solvent therefor must be sufficiently low to prevent substantial dissipation of incident fluorescigenous energy as heat by the dye molecules themselves, and (b) The thickness of the sheeting (with respect to the direction of the incident daylight) must be sufficient to permit the dye to convert and modify an appreciable percentage of the incident daylight transmitted by the transparent solvent for the dye and the transparent sheeting in which the solvent for the dye may be dispersed.

The above further conditions were derived from observing that the tinctorial effect of a weak solution of a fluorescent dye could be matched by a still weaker solution of the dye if the depths of the two dye solutions were substantially inversely proportional to the concentrations of the dye in the solutions. It was then discovered that the tinctorial strength of strong, substantially non-fluorescent concentrations of a dye could be equaled by weak fluorescent concentrations of the dye provided that the depths of the two solutions were, again, substantially inversely proportional and the light-diffusing property of the less concentrated (and, consequently, more transparent) solution was properly augmented, as by means of a proper diffusely reflecting background, for example. In short, (b), above signifies that tinctorial strength is a function of the number of molecules of dye per unit of area of sheeting in which the dye is dispersed. Thus, to obtain both fluorescence and tinctorial strength we (a) limit the concentration of dye in the solvent to obtain fluorescence and (b) vary the depth of the solution per unit of area of the sheeting to obtain the desired tinctorial strength. This last step is in contradistinction to the prior art, which increased tinctorial strength by increasing the concentration of dye. Our limitations are conveniently expressed in terms of (a) grams of pure dye per cubic centimeter of solvent for the dye in the sheeting and (b) grams of pure dye per square centimeter of sheeting.

It should be noted that in the foregoing general description of the type of limitations necessary for daylight fluorescence, the dye is described as being in solution, for we have noted that the dyes must be in solution or, if present in a solid, be in a state akin to solution, i. e., the dyes must be solvated. It is also to be noted that the dyes, when limited in terms of grams per unit of measure, are described as pure dyes; many commercial dyes are supplied in a relatively impure state or are diluted or extended. The relative purity of the actual dye employed must be taken into account in compounding the daylight fluorescent pigments and sheetings within the following limits.

As pointed out in our above identified application, Serial No. 575,364, a peculiarity of daylight fluorescent dyes is that the permissible concentration of dyes decreases as the wave-length of the predominant wave length of light projected by the solvated dye increases. Likewise, it has been found that the permissible volume of dye per square centimeter of surface of the sheeting decreases as the wave-length of the dominant wave length of light projected by the solvated dye increases. Thus, for example, the permissible maximum number of molecules of solvated dye per square centimeter of sheeting is less for red daylight fluorescent dyes than for orange daylight fluorescent dyes, less for daylight fluorescent orange dyes than for yellow dyes, and so forth through the spectral colors. A peculiar convenience of expression arises when the dye is specified by weight rather than by number of molecules, because, in general, the molecular weight of dyes capable of exhibiting daylight fluorescence increases as the dominant wave length of projected light increases in wave-length, thus tending to counterbalance the above stated decrease in permissible volume of dye per unit of area, so that in our daylight fluorescent compositions:

.0005 gram of dye per square centimeter of sheeting is a practical maximum in any daylight fluorescent system composed of a single dye and a solvating material.

.00006 to .00003 gram of daylight fluorescing dye per square centimeter of sheeting and at concentrations of less than .01 gram per cubic centimeter of sheeting will produce optimum daylight fluorescence.

.000015 gram of daylight fluorescing dye per square centimeter is the minimum amount of dye which will exhibit daylight fluorescence of high chroma or purity of color, although for purpose of tints, no practical minimum has been found, since daylight fluorescent tinting effects have been noted in dilutions exceeding one part of daylight fluorescing dye in many million parts of solvating material.

The effect of the wave-length of the dominant wave-length of light projected is more apparent in connection with the permissible maximum concentration of dye in the solvating material. Thus:

.015 gram per cubic centimeter of solvating material in the final sheeting is the permissible maximum for red daylight fluorescing dyes.

.025 gram per cubic centimeter of solvating material in the final sheeting is the permissible maximum for yellow green dyes.

The maximum permissible concentration of dyes of other dominant wave-lengths may be established by extrapolation or interpolation.

The foregoing maxima and minima are given for final sheetings having a white background having a diffusing reflectance factor of at least 80% of that of a standard magnesium oxide block. The provision of a background which is an efficient diffusing reflector is of great importance in obtaining maximum brightness and purity of color, as is the provision of a solvating material and/or sheeting material which does not absorb appreciable amounts of incident daylight or projected light. Thus dark, turbid, solvating materials are to be avoided and "water-white" solvating materials are generally best, though milky-white solvating materials are often excellent where the ingredient causing milkiness is a diffuser rather than an absorber.

It is to be noted further that the foregoing maxima and minima are stated for a single dye in a solvating material. It is often desirable to use a plurality of daylight fluorescing dyes in the same solvating material. In such cases, and where the predominant emission wave-bands of the dyes do not overlap, as in the case of the red dyes and yellow-green dyes, it is possible to use concentrations of each up to its permissible maxima.

When, to obtain maximum intensity of color, it is necessary to use the maximum grams of dye per square centimeter, it is preferable to use the lower values of dye per cubic centimeter of solvating material in the final sheeting, that is, in short, to use thick sheetings in which the dye concentration is very low.

In order to obtain sheetings which exhibit the desired daylight fluorescence, it is possible to dissolve the dye in a suitable sheet-forming material. We prefer, however, to obtain the desired sheetings having the necessary amounts and concentrations of daylight fluorescing dyes by pigmenting the sheetings. That is, the dyes are dispersed in a suitable, substantially solid, solvating material which will maintain the dyes in a solvated state. The dyed solvating material is then ground to fine pigment size and dispersed in a sheeting material, which may be dissolved in a suitable solvent therefor or which may be in a fused or molten condition. The advantages of daylight fluorescent pigmented sheetings are: First, it permits a wider variety of sheeting materials to be used and thus provides a wider scope of application while affording the fluorescent stability of hard but fragile pigments containing the solvated dyes. Second, better control of dye concentration is obtained; if the dye is merely dissolved in the sheeting, fluorescence-quenching "skinning" effects may be obtained due to migration and excessive concentration of dye at the surface of the sheeting during the formation of the sheet from the sheeting material. By having the dye dissolved in the pigment rather than in the sheeting material, skinning, no matter how bad, cannot concentrate the dye in excess of a maximum concentration fixed by the concentration of the dye in the pigment.

We have discovered that the proper solvating materials for daylight fluorescing dyes are polymerizable thermo-setting resinous materials in which the dyes will be held in a solvated state when the materials are polymerized. The advantages of such materials are many-fold. Although such thermo-setting resinous materials may vary from tough, horn-like to brittle glass-like materials when polymerized, the fact that such polymerized materials are thermo-setting, rather than thermo-plastic, permits them to be ground to minute pigment-size particles, whereas particles of thermoplastic materials will tend to cohere and "gum up" during grinding. Other excellent pigment characteristics of such materials are that the finely ground powders may be readily dispersed in most sheeting materials without flocking and without dissolving; further, such resins are usually remarkably inert, both with respect to the sheeting material and the solvated dye, and are impervious and stable. Being essentially amorphous, such resin materials tend to hold the solvated dyes in a homogeneous dispersion throughout a pigment particle, thus enveloping and protecting relatively unstable dyes, rather than tending to throw the dyes out of solution onto the surface of a pigment particle, as in the case of crystalline materials. As pointed out in our application, Serial No. 575,364, unplasticized, unmodified urea-formaldehyde or alcohol-modified urea-formaldehyde resins, after thermosetting, exert a marked stabilizing effect upon the fluorescent life of daylight fluorescent dyes. These materials are, therefore, generally preferred as carriers for the dyes in our pigments, not only because of the desirable pigment properties of the general class of thermo-setting resins but also because of their remarkable stabilizing effect upon the solvated dyes.

To solvate the dyes in the suitable pigment carrier, one of the following procedures may be employed:

(a) The dye is dissolved in a solution of the unpolymerized resin and a mutual solvent for the resin and dye so that concentration of the dye in the resin will not finally exceed the applicable maximum. The resin is then polymerized by heat, alone, or by heat in the presence of a catalytic agent, such as an acid. The polymerized resin is then ground to fine pigment size, preferably until the average size of resin particles ranges from about 2.5 to 50 microns, although the size may be larger for use in certain sheetings which will tolerate coarser pigments. The dyed resin may be ground dry, or wet, or even in the sheeting material, although dry grinding is generally practiced to permit the pigment particles to be air-classified so that larger particles may be returned to the mill for further grinding. The operativeness of this procedure depends, of course, upon the ability of the dye to withstand the often rigorous conditions of polymerization and grinding and the ability of the resin to hold the dye in a solvated condition.

(b) The undyed resin is polymerized and ground, similarly to the dyed resins above. The dye is dissolved to provide a dye bath in which the concentration of dye may, though not necessarily, exceed the concentration maxima given above. The ground polymerized resin is then dispersed in the dye bath and dyed by the migration of dye from solution in the dye bath to a solvated condition in the resin pigment powder, care being exercised so that the concentration of dye in the pigment particle solvent does not exceed the permissible maxima. The dyed resin pigment particles are then removed from the dye bath and are generally washed and dried, although the washed wet filter cake of pigment may be flushed directly into the sheeting material where the material will preferentially wet the pigment particles. The operativeness of this procedure depends, of course, upon the ability of the polymerized or hardened resin to solvate the dye. Although unplasticized, unmodified urea-formaldehyde and unplasticized, alcohol-modified urea-formaldehyde, for example, are dense, hard, substantially impervious glass-like materials which show no practical substantivity for the dyes when the resins are polymerized in sheets and bars, nevertheless, it has been found that powders of these resins possess the power of taking up most daylight fluorescent dyes from a dye bath solution. The probable explanation for this phenomenon is that, in so far as the dye in the dye bath is concerned, the resin pigment particles are merely particles of a supercooled liquid having great solvating power for the dye, the hardness of the particles merely slowing the rate of dye dispersion into the particles, and, because the particles are substantially all surface, the slightest depth of penetration of the dye into the resin particles will be substantially complete penetration and, thus, the low maximum permissible dye-resin concentration may be reached relatively quickly.

Of the foregoing procedures, the first (a) has the advantage of permitting accurate control of the dye-solvating resin ratio and is, accordingly, recommended when pigments having dye-resin concentrations aproaching the permissible maxima are desired. The second (b) has the advantage of permitting the use of dyes which are adversely affected by the conditions of polymerization and also provides a convenient procedure for manufacturing when it is desired to produce small batches of pigments of different colors. It is also to be understood that the above procedures are not limited (a) to the use of completely unpolymerized resins nor (b) to the use of completely polymerized resins; depending upon the degree of polymerization, partly polymerized resins may be dyed either before or after grinding and before complete polymerization. It may even be an advantage to postpone complete polymerization where the pigments are to be used in sheeting materials which are fused or melted to permit polymerization to be completed by the heat of the sheeting material when in the molten state.

Selection of sheeting material

Dry pigments made according to our foregoing procedures usually give a slight indication of daylight fluorescence but not nearly as much as they impart to the ultimate sheetings. The appearances of the finely ground pigment powders indicate that these organic pigments are slightly fluorescent even though grinding to such small pigment size greatly reduces the fluorescent effect. Coarser pigments, though still relatively dull, show a greater degree of fluorescence. We have discovered, however, that the decreased fluorescent appearance of our dry pigments is due to the effect of the index of refraction of the solvating carrier for the dye with respect to the air which wets the dry pigment particles and that the fluorescent effect is greatly increased by dispersing and wetting the pigments in a sheeting material which has substantially the same refractive index as the resin of the pigment in which the dye is solvated.

The importance, if optimum results are to be obtained, of selecting a sheeting material having substantially the same refractive index as the refractive index of the resin of our pigment is apparently due to the fact that our pigments owe their color not only to reflected incident light but also to incident fluorescigenous light. Thus, any total reflection due to a difference in the refractive indices of our pigment and the sheeting material robs the pigment not only of light which may be reflected but also of fluorescigenous light. Minimum total reflection is obtained, of course, when the indices of refraction of the pigment and vehicle are equal, and it has been observed that no appreciable chalkiness is apparent if the difference in indices of refraction of the pigment and sheeting material is less than approximately fifteen per cent of either one; if the difference in indices of refraction is increased more than this extent, the final sheeting tends to become chalky.

For optimum brightness, the sheeting material is preferably transparent, not only to visible light but also to near ultraviolet. For optimum fluorescent stability, the sheeting material is preferably completely inert with respect to the pigment. Otherwise the sheeting material is selected simply on the basis of the requirements for final sheeting.

Sheeting materials which have been found to fulfill these requirements are the various kinds of vinyl sheetings prepared from vinyl chloride polymers, vinyl butyral polymers, vinyl acetate polymers, copolymers of vinyl chloride and vinyl acetate known by the trade name "Vinylite" and other similar thermoplastic resins which are transparent or are slightly translucent.

Any of the conventional plasticizers for these resins may be used, such as dimethyl phthalate, dibutyl phthalate, dioctyl phthalate (known as "Flexol" DOP), triglycol dihexoate (known as "Flexol" 3GH), triglycol dioctoate (known as "Flexol" 3GO) and other plasticizers all of which are well known.

Preparation of fluorescent sheetings

A pigment prepared in accordance with the following examples is thoroughly mixed and uniformly dispersed in a thermoplastic, resinous, substantially transparent sheeting material which is in liquid form. This may be accomplished by either heating the sheeting material to fluidity or by dissolving the sheeting material in a suitable solvent, such as acetone alkyl acetates and the like, until the solution is sufficiently fluid to permit the mixing of the pigment therein.

After the pigment particles have been thoroughly dispersed throughout the sheeting material, it is formed into sheets of any desired thickness by conventional means which are well known in that art.

Care must be taken in forming sheets of any particular desired thickness that the limitations as to weight of dye per unit of area of the sheet and the weight of dye per unit of volume of the final sheet are fully met. This can be accomplished by varying the proportion of pigment to sheeting material when the concentration of dye in the pigment is fixed. On the other hand, if the proportion of pigment to sheeting material must be limited within a narrow range in order to meet critical physical specifications, then the concentration of dye in the pigment may be varied to meet the critical limitation for "daylight fluorescence."

When using a pigment as described in Example 1, a most satisfactory daylight fluorescent sheet having a thickness of 8 mils is obtained by using 15% by weight of the pigment, 60% by weight of the copolymer of vinyl chloride and vinyl acetate and 25% by weight of dioctyl phthalate as plasticizer. It will be clear, however, that the ratio of polymer sheeting material to plasticizer may be varied within relatively wide limits depending on the desired physical characteristics of the final sheet.

The daylight fluorescence of the sheet may be augmented by applying a white vinyl coating ink to one side of the sheet so as to provide a diffusely reflecting background. Normally the white ink coating is about 2 mils in thickness.

If the sheet is to have a thickness of 16 mils, approximately ½ as much pigment is used up for an 8 mil sheet, and the quantity of the remaining materials are varied so as to maintain the proper ratio therefor. This enables one to maintain the critical limitation of weight of dye per unit of area of the sheet even though the sheet is thicker.

Obviously, the proportion of pigment in the sheet will vary depending upon the dye concentration in the pigment, the nature of the dye, i. e. its predominant color characteristics, the thickness of the final sheet and the desired daylight fluorescent effect of the final sheet.

Specific illustrative but not limitative examples of daylight fluorescent pigments may be used in our invention as follows:

Example 1

Parts (by weight)
(1) Butyl alcohol-modified urea-formaldehyde solution (50% solids) _____ 50
(2) 4 amino 1,8 naphthal p-xenylimide_____ .2

The daylight fluorescent dyestuff (2) is dissolved in the resin solution (1) and the dyed resin solution is then polymerized by a suitable procedure, as by heating at 90° C. until jelled, cutting the jell into small pieces and curing at 140–145° C. until the dyed resin is polymerized to a glass-like hardness. (Such curing should be conducted under well ventilated conditions, e. g., in an air circulating oven.) The dyed polymerized resin is then ground until the particles will pass a 200-mesh screen, as by first grinding the material in a hammer mill and then grinding in a pebble mill and passing through an air-classifier which will remove the fines of the desired pigment-particle size and return the coarser particles to the mill for further grinding.

The dye in the pigment made according to this example will be solvated in the polymerized resin carrier at the ratio of .01 gram of dye per cubic centimeter of carrier. When dispersed in the sheeting material and formed into sheets having a coating of white ink on one side, this sheet will exhibit brilliant yellow-green fluorescence.

Example 2

Parts (by weight)
(1) Aqueous dispersion of unmodified urea-formaldehyde resin (50% solids) _____ 100
(2) 4 amino 1,8 naphthal p-xenylimide __ .417
(3) Ethyl ester of meta monoethyl amino-phenyl-phthalein hydrochloride _____ .0625

The dyes (2 and 3) are dissolved in the resin dispersion (1), which is then polymerized and ground by suitable means and procedures, as in Example 1. In the resultant pigment the weight of dye (2) projecting yellow-green light is .0104 gram and of dye (3) projecting red-orange light is .00156 gram per cubic centimeter of solvating resin, the projected light of the two dyes being additive to project a brilliant rich yellow daylight fluorescence when properly dispersed in an elastomer sheeting.

Example 3

Parts (by weight)
(1) Butyl alcohol-modified resin solution (50% solids) _____ 100
(2) 4 amino 1,8 naphthal p-xenylimide __ .6
(3) Meta diethylaminophenol-phthalein hydrochloride _____ .094
(4) Ethyl ester of meta monoethyl-aminophenol - phthalein hydrochloride _____ .125

The dyes (2, 3 and 4) are dissolved in the resin solution (1) which is then polymerized and ground by suitable means and procedures, as in Example 1. In the resultant pigment the weight of dye per cubic centimeter of solvating resin is .015 gram for the dye (2) projecting yellow-green light, .00235 gram for the dye (3) projecting red light, and .00312 gram for the dye (4) projecting orange-red light, the projected light of the three dyes being additive to produce a brilliant rich orange daylight fluorescence when the pigment is properly dispersed in an elastomer sheeting.

Example 4

Parts (by weight)
(1) Alcohol solution of alcohol-modified urea - formaldehyde resin (50% solids) _____ 100
(2) Methyl alcohol _____ 200
(3) Ethyl ester of meta monoethylamino-phenol-phthalein hydrochloride _____ 1

The solution (1) is polymerized and ground to produce a fine undyed pigment powder, by suitable procedure, as in reducing the dyed resin in Example 1 to a pigment. The dye (3) is dissolved in the alcohol and the solution is heated to a temperature of 40–50° C. While maintaining the dye solution at that temperature, the undyed pigment powder is suitably stirred in the solution until approximately .005 gram of dye per cubic centimeter of resin has been solvated in the pigment powder; the dyed pigment powder is then filtered from the solution, washed and dried. When suitably dispersed in an elastomer sheeting, the sheet exhibits a bright pinkish-salmon daylight fluorescence.

Example 5

Parts (by weight)
(1) Succinic anhydride _____ 100
(2) Pentaerythritol _____ 68
(3) Ethylene glycol monomethyl ether ___ 5
(4) Meta diethylaminophenol - phthalein hydrochloride _____ .5

The succinic anhydride and pentaerythritol are mixed and heated in a beaker on a hot plate until the liquid which forms indicates the start of polymerization by becoming viscous. The dye (4) is dissolved in the solvent (3) and the dye solution is added to the resinous carrier (1 and 2). The mixture is then further heated with stirring to thoroughly solvate the dye in the resinous mass and evaporate the dye solvent (3) from the mass. When the mass has become extremely viscous, it is poured into shallow pans and cured at 135–140° C. until very hard. The dyed polymerized mass is then broken out and ground to proper pigment size. The resulting pigment has a dye concentration of approximately .005 gram of dye per cubic centimeter of polymerized thermo-set solvating material. When properly dispersed in an elastomer sheeting, the sheet exhibits an extremely brilliant, rich red daylight fluorescence.

It is to be understood that other polymerized thermosetting resinous materials may be employed for the solvating dye carrier in a like manner to those disclosed in the foregoing examples. Such other materials which have been found suitable for the purposes of this invention include, for example, casein-modified urea-formaldehyde resins, melamine resins, silicone resins (methylated from 1 to 1.9 methyls/silicon), methyl silicons copolymerized with alcohol-modified urea-formaldehyde, and the like. Still other like and probably better dye solvating carrier materials will undoubtedly be discovered in the future.

It is to be understood that our sheetings may be provided with a diffusely reflecting coating to augment the daylight fluorescent effects. However, if our pigment is dispersed in a sheeting material which is comprised of two or more transparent polymers having sufficient differences in refractive indices to provide a diffuse reflection within the sheet but not with respect to the dispersed light-modifying pigment, the desired diffuse reflection may be obtained. Furthermore, if desired one surface of the sheet may be etched or abraded to provide a diffusely reflecting surface.

From the foregoing specific examples, it should be apparent that further modifications and variations may be made by those skilled in the art without departing from the scope of our invention as defined in the following claims. In the following claims, it is to be understood that the term "transparent" as applied to the solvating dye carrier and the sheeting material means that the carrier and sheeting are not opaque to either the light projected by the solvated dye or the fluorescigenous light which excites the dye to fluorescence. The term "index of refraction" refers to the index of refraction relative to air. It is also to be understood that the term "dye" refers to pure dye; that when a dye is said to project light of a given color, such color is the dominant wave-length of light projected by the dye; and that the term "dilute solution" means a solution of dye having a concentration of dye not greater than the concentration of dye stated in the claim. It is to be further understood that the term "polymerized carrier" means thermosetting resinous material polymerized to the extent that the material may be crumbled under shearing loads.

What is claimed is:

1. A daylight fluorescent sheeting comprising a substantially transparent sheet of thermoplastic resinous material, at least one solvated dye exhibiting a subtractive color and fluorescing in response to daylight when in dilute solution, and pigmenting particles of a transparent thermoset resinous carrier in which said dye is maintained in a solvated state, said particles being dispersed throughout said sheet, the maximum weight of dye per volume of carrier varying from substantially .025 gram for dyes projecting yellow-green light to substantially .015 gram of dye per cubic centimeter of solvating carrier for dyes projecting red light, and the weight of said at least one dye not exceeding .0005 gram of dye per square centimeter of surface of the sheeting.

2. A daylight fluorescent sheeting as claimed in claim 1 and further comprising a diffusely reflecting coating on one surface of said sheeting.

3. A daylight fluorescent sheeting as claimed in claim 1 wherein the maximum difference in indices of refraction of said carrier and said thermoplastic resinous sheeting does not exceed substantially 15% of the greater index of refraction.

4. A daylight fluorescent sheeting as claimed in claim 1 in which the proportion of said dye to carrier is less than .01 gram of said dye per cubic centimeter of carrier and the amount of said dye per square centimeter of surface of the sheeting varies from .00006 and .00003 gram.

5. A daylight fluorescent sheeting as claimed in claim 1 wherein the amount of said dye per square centimeter of surface of the sheeting is at least .000015 gram.

6. A daylight fluorescent sheeting as claimed in claim 1 wherein the transparent sheet of thermoplastic resinous material is plasticized.

7. A daylight fluorescent sheeting as claimed in claim 1 wherein the thermoplastic resinous material contains an alkyl phthalate.

8. A daylight fluorescent sheeting as claimed in claim 6 wherein the sheeting is about 8 mils in thickness and comprises about 60% by weight of a thermoplastic resinous material, 25% by weight of a plasticizer and 15% by weight of the transparent polymerized resinous carrier for the solvating dye.

9. A daylight fluorescent sheeting as claimed in claim 1 wherein the maximum weight of said dye per volume of carrier is proportional to the length of the dominant wave length of light projected by said dye.

10. A daylight fluorescent sheeting as claimed in claim 1 wherein the thermoplastic resinous material contains a transparent medium having an index of refraction differing from that of said thermoplastic resinous material to impart light-diffusing properties to the sheeting.

11. A daylight fluorescent sheeting as claimed in claim 1 wherein one surface of said sheeting is roughened to diffusely reflect light projected by said dye.

12. A daylight fluorescent sheeting as claimed in claim 1 wherein said carrier material is a pulverized, unplasticized, polymerized thermoset resin of the class consisting of unmodified urea-formaldehyde and butyl alcohol-modified urea-formaldehyde resin.

13. A daylight fluorescent sheeting as claimed in claim 1 wherein the thermoplastic resinous sheeting material comprises at least one polymerized vinyl compound selected from the class consisting of vinyl esters and vinyl halides.

JOSEPH L. SWITZER.
ROBERT C. SWITZER.

REFERENCES CITED

The following references are of record in the file of this patent:

UNITED STATES PATENTS

| Number | Name | Date |
| --- | --- | --- |
| 1,150,118 | Hewitt | Aug. 17, 1915 |
| 2,037,793 | Jacobson | Apr. 21, 1936 |
| 2,039,734 | Meder | May 5, 1936 |
| 2,084,526 | Grenier | June 22, 1937 |
| 2,113,090 | McKeag | Apr. 5, 1938 |
| 2,149,993 | Fonda | Mar. 7, 1939 |
| 2,152,856 | Switzer | Apr. 4, 1939 |
| 2,180,508 | DeFraine | Nov. 21, 1939 |
| 2,333,329 | Miglarese | Nov. 2, 1943 |
| 2,341,009 | Axelarad | Feb. 8, 1944 |
| 2,360,516 | Schmidline | Oct. 17, 1944 |